United States Patent [19]

Swope

[11] 4,283,139
[45] Aug. 11, 1981

[54] INSTRUMENT FOR OPTICALLY MEASURING SOFT CONTACT LENS PARAMETERS

[75] Inventor: C. Hermas Swope, Westborough, Mass.

[73] Assignee: American Optical Corporation, Southbridge, Mass.

[21] Appl. No.: 118,274

[22] Filed: Feb. 4, 1980

[51] Int. Cl.³ .............................................. G01B 9/00
[52] U.S. Cl. ..................................... 356/125; 356/127
[58] Field of Search ....................... 356/124, 125, 127

[56] References Cited

U.S. PATENT DOCUMENTS

| | | | |
|---|---|---|---|
| 3,804,523 | 4/1974 | McCormack | 356/124 |
| 3,822,096 | 7/1974 | Wilms | 356/124 |
| 3,985,445 | 10/1976 | Tagnon | 356/125 |
| 4,033,696 | 7/1977 | Nohda | 356/127 |
| 4,130,361 | 12/1978 | Humphrey | 356/125 |

FOREIGN PATENT DOCUMENTS 1166502  3/1964  Fed. Rep. of Germany ........... 356/124

OTHER PUBLICATIONS

Wray, L., "The Measurement of Hydrophilic Contact Lenses; Part I", *The Ophthalmic Optician*, Apr. 1, 1972, p. 256t.
Wray, L., "The Measurement of Hydrophilic Contact Lenses, Part II", *The Ophthalmic Optician*, Apr. 15, 1972, pp. 301-304t.

*Primary Examiner*—R. A. Rosenberger
*Attorney, Agent, or Firm*—Alan H. Spencer

[57] ABSTRACT

Apparatus is disclosed for determining, with improved accuracy, the back vertex power of a hydrated soft contact lens. The increased accuracy is determined by sequentially using several optical modes to provide additional information needed to accurately calculate back vertex power. Lens thickness, sagittal height and posterior radius values are also accurately obtained with the apparatus.

Optionally, a mode for determining lens radius and thickness is also disclosed.

11 Claims, 8 Drawing Figures

INSTRUMENT FOR OPTICALLY MEASURING SOFT CONTACT LENS PARAMETERS

BACKGROUND OF THE INVENTION

The present invention relates to an instrument for measuring contact lens parameters and more particularly to an instrument for accurately measuring contact lenses while immersed in a solution of known refractive index, e.g., saline solution.

The soft contact lens industry, as well as doctors prescribing soft contact lenses, have been confronted with an inability to accurately determine the essential parameters of soft contact lenses after hydration. Previously, most soft contact lens parameters were determined by the industry while the lens was in the "hard" or unhydrated state. The values thus determined are subsequently converted to "expected parameters" based upon calculated changes occurring during hydration. While in the hard stage, the contact lens may be measured using conventional instruments for measuring hard contact lenses.

The practice of determining parameters of a soft contact lens by determinations made while it is in the unhydrated or "hard" stage is fraught with disadvantages. Most of these disadvantages result from unpredictable and inconsistent variations between lenses when hydrated. Since soft contact lenses rapidly lose water of hydration and are extremely flexible and susceptible to distortion when in the hydrated state, instruments for measuring hard contact lenses cannot accurately determine the parameters of a hydrated soft contact lens. For example, dial indicators which are normally used to determine the thickness of a hard contact lens or an unhydrated soft contact lens, but they compress a hydrated soft contact lens producing inaccurate results. Also the index of refraction change with the water content, and power measurements are inaccurate and unreproducible unless the soft lens is immersed.

There exist some devices for approximating the parameters of hydrated soft lenses but these are highly dependent on operator skill, the operator's ability to interpolate and the assumption that ordinary focimeters can accurately measure the power of an immersed lens.

As explained in an article by L. Wray, the Ophthalmic Optician, Apr. 1, 1972, pgs. 256, 261-264 and Apr. 15, 1972, pgs. 301-304 and 309-311, the relatively simple formula for vertex power (front and back) used for air-lens interfaces will not provide the requisite accuracy of calculated vertex power for an immersed lens. The lens thickness and the power of each surface are essential factors in accurately measuring immersed hydrated contact lenses. Without accurate values for these factors, the power computation may have an error greater than 0.5 diopter. The problems of obtaining accurate values for thickness, radii and power are also discussed in the article.

U.S. Pat. No. 3,804,523 relates to a conventional radiuscope for measuring the thickness of hydrophilic contact lenses using a special lens support. The lenses are not immersed during measurement.

U.S. Pat. No. 3,985,445 relates to an optical instrument for measuring the power of an immersed hydrophilic contact lens. Lens power is determined by a scale showing the position of a target projected along the optical axis through the lens to a reference plane in an observation system. This patent erroneously teaches the calculation of lens power using the same formula used to calculate lens power when the lens is in air. As discussed hereinabove, lens thickness and anterior surface radius are necessary for an accurate determination of lens power when the lens is measured while immersed in a liquid.

It is an object of the present invention to accurately measure the parameters of an immersed, hydrated, soft contact lens.

It is another object of the present invention to overcome the disadvantages of the prior art devices.

It is still another object of the present invention to provide a single device for accurately measuring back vertex power, thickness and posterior lens radius of hydrated soft contact lenses.

BRIEF DESCRIPTION OF THE PRESENT INVENTION AND DRAWINGS

The apparatus of the present invention includes an optical system having a source for projecting a collimated beam of light parallel and spaced from the optical axis of the system. In one mode, the light passes through the soft contact lens and the beam is returned by a retro-reflector through the lens on the opposite side of the optical axis. A detector determines when the beam intersects the instrument center line at the point of reflection. Comparison of the distance between the lens and the reflector with a reference distance provides an approximation of back vertex power.

In the other mode, the lens thickness and saggital height can be measured. A positive lens is positioned on the center line between the source and the contact lens. The distance between the respective intersections of the beam and center line, as determined by reflection, at the anterior and posterior lens surfaces is equal to the apparent thickness. Saggital height is measured by similarly comparing distance between the points of reflection from the posterior surface and the lens support. Posterior radius can be calculated from saggital height when the diameter of the pedestal supporting the lens is known. These values, in combination with the approximation of lens power, are used to calculate the actual power, actual thickness, and posterior radius of the contact lens.

A microscope may be modified to provide a convenient source of many components and additionally permit measurement of the lens diameter by comparison with a measuring reticle in the eyepiece focal plane.

Figure 1:
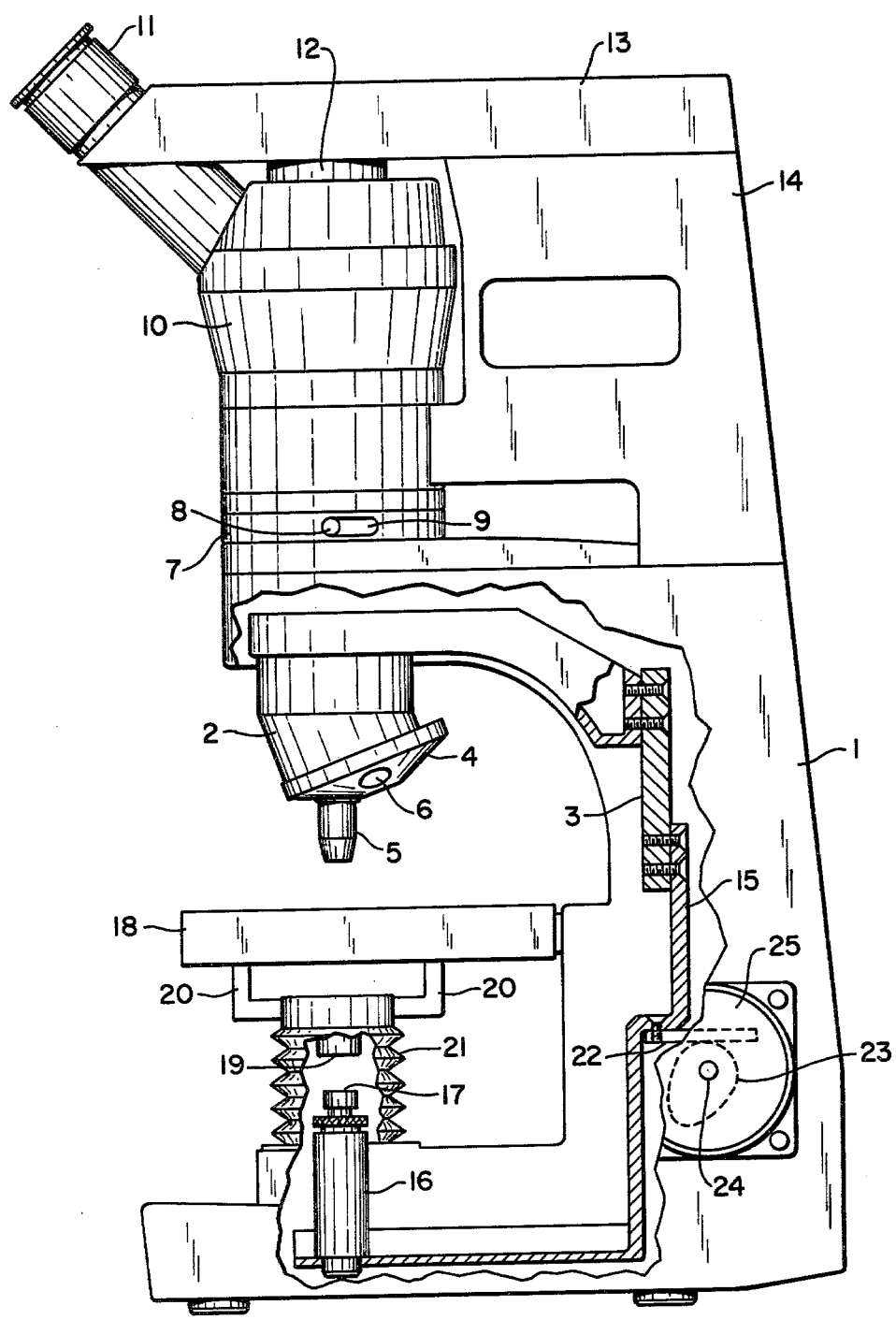
FIG. 1 is a side plan view, partly in section, of an embodiment of the present invention.

Referring to FIG. 1, microscope stand 1 has nosepiece 2 depending from focusing linkage 3. Turret 4 is rotatably connected to nosepiece 2 and carries objective 5. Opening 6 in turret 4 may be selectively positioned on the instrument center line to permit light to pass through nosepiece 2 and turret 4 without modification. Aperture viewer 7 is mounted to stand 1 above nosepiece 2. Knob 8 is movable in slot 9 to shift the optical assembly of viewer 7 onto and off of the instrument center line. Body 10 is mounted above viewer 7 and supports eyepiece 11. Shortened photo tube 12 provides an optical passage from body 10 to top 13 of housing 14.

Extension 15 connects support 16 to focusing linkage 3. Mirror mount 17 is threadably connected to support 16 and moves as a unit with objective 5. Stage 18 has power objective 19 supported by mounting arms 20. Cover 21 provides a light shield between power objective 19 and mirror mount 17. Cam follower 22 protrudes from extension 15 and engages cam 23 mounted on shaft 24 of stepping motor 25. Any conventional focusing mechanism may be substituted for the simplified focusing mechanism illustrated by cam follower 22 and cam 23. Similarly, the focusing mechanism could be manually operated in a conventional manner rather than being driven by stepping motor 25.

Figure 2:
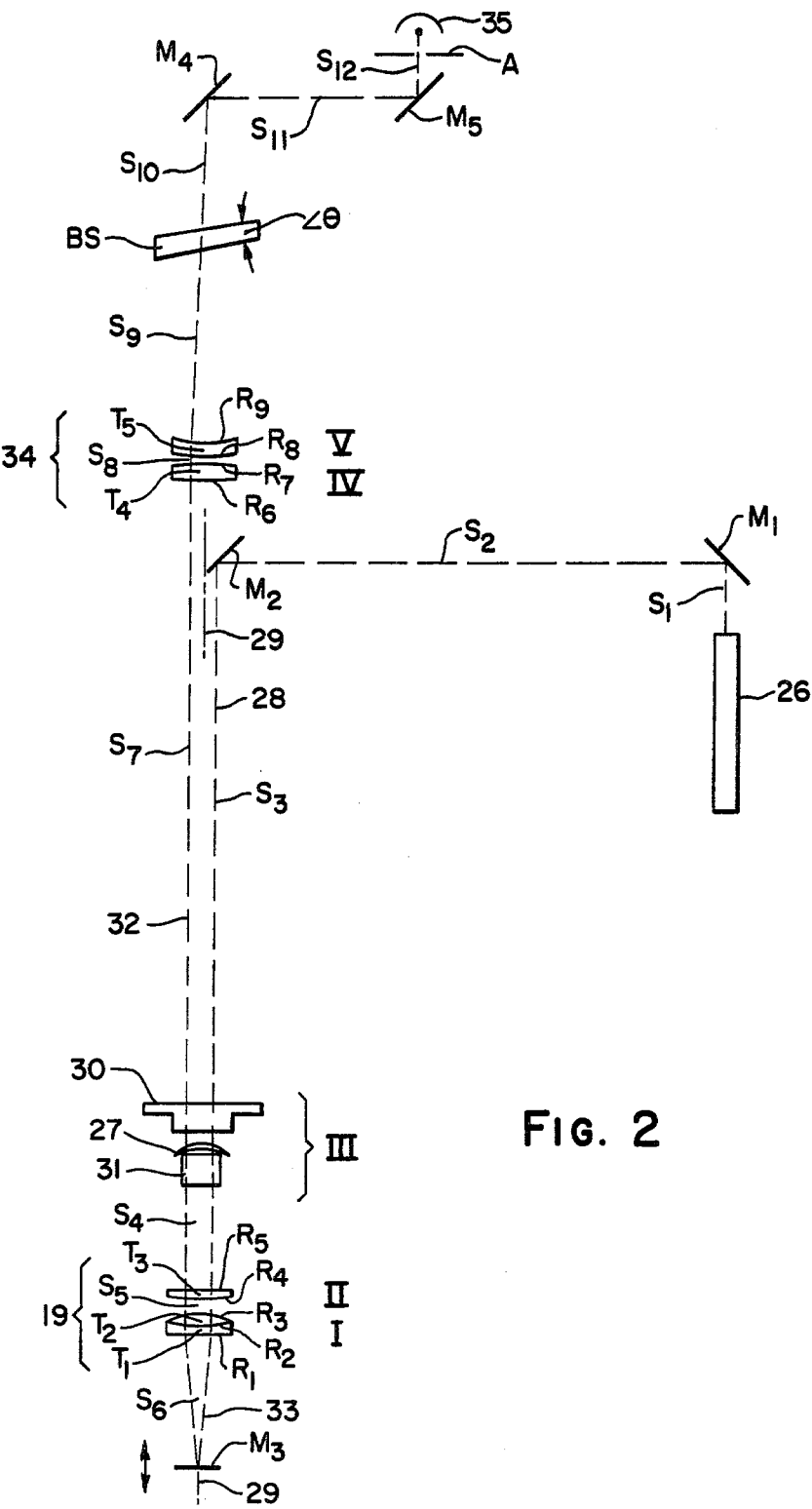
FIG. 2 is an optical diagram of a preferred embodiment of the power measuring mode of the invention.

Referring to FIG. 2, light from laser 26 is directed by plano mirrors $M_1$ and $M_2$ toward contact lens 27, which is to be tested. Light from $M_2$ is directed towards lens 27 and travels along path 28 which is parallel to and spaced from instrument center line 29. Contact lens holder III has cover 30 and pedestal 31. Contact lens holder III is intended to support contact lens 27 in a liquid medium (not shown) such as a physiologically acceptable aqueous saline solution. A representative holder is disclosed in copending application Ser. No. 091,317 filed Nov. 5, 1979. After refraction by contact lens 27, the light is converged toward center line 29 by power objective 19. Power objective 19 has plano-convex doublet I and convex-plano singlet II. Plano mirror $M_3$ is selectively movable along instrument center line 29 and reflects light back through power objective 19 and contact lens holder III with contact lens 27 therein. From contact lens holder III, the light passes along path 32 which is parallel to center line 29. The spacing between light path 32 and center line 29 will be the same as the spacing between light path 28 and center line 29 when mirror $M_3$ is positioned at the intersection of converging light path 33 with center line 29. Telescope unit 34 has biconvex positive singlet IV and negative meniscus singlet V. Telescope unit 34 and beam splitter BS are mounted in body 10 shown in FIG. 1.

Referring again to FIG. 2, light received along path 32 is imaged by telescope unit 34 and deflected by plano mirrors $M_4$ and $M_5$ toward the plane of aperture A. When the spacing between center line 29 and path 28 is the same as the spacing between center line 29 and path 32, the light will pass through aperture A to detector 35.

Parameters of one preferred embodiment for determining the power of a hydrated contact lens are set forth in Table I. In the Table, distances are in millimeters and identified in order from the source of light, laser 26, to aperture A. Thicknesses of the lenses and radii are also in millimeters with a minus (—) sign indicating a surface having a vertex on the side of the lens surface toward mirror $M_3$. Refractive indices and Abbe numbers are absolute values.

TABLE I

| Lens or Mirror | Radius (R) | Thickness (T) | Spacing (S) | Index of Refraction (ND) | Abbe Number ($\nu$) |
|---|---|---|---|---|---|
| $M_1$ | $\infty$ | | $S_1 = 17.8$ | | |
| $M_2$ | $\infty$ | | $S_2 = 137.4$ | | |
| III | | Cover Thickness = 6.35 ND = 1.517 Distance between Cover and Pedestal = 4.4 Pedestal Thickness = 8.3 ND = 1.517 | $S_3 = 164.1$ $S_4 = 29.0$ | | |
| II | $R_5 = \infty$ $R_4 = 64.369$ | $T_3 = 2.4$ | $S_5 = 3.04$ | $ND_3 = 1.517$ | $\nu_3 = 64.5$ |
| I | $R_3 = -18.07$ $R_2 = 30.15$ $R_1 = \infty$ | $T_2 = 2.6$ $T_1 = 1.35$ | $S_6 = 23.45$ to $36.15$ $S_7 = 190.5$ | $ND_2 = 1.517$ $ND_1 = 1.7506$ | $\nu_2 = 64.5$ $\nu_1 = 27.8$ |
| IV | $R_6 = 112.702$ $R_7 = -72.305$ | $T_4 = 2.5$ | $S_8 = 0.26$ | $ND_4 = 1.573$ | $\nu_4 = 57.4$ |
| V | $R_8 = 44.201$ $R_9 = 27.735$ | $T_5 = 2.4$ | $S_9 = 56.2$ | $ND_5 = 1.580$ | $\nu_5 = 41.0$ |
| BS | | Thickness = 3.2 | $S_{10} = 37.6$ | ND = 1.517 | $<\theta = 0,18'$ |
| $M_4$ | $\infty$ | | $S_{11} = 55.9$ | | |
| $M_5$ | $\infty$ | | $S_{12} = 15.7$ | | |

Figure 4:
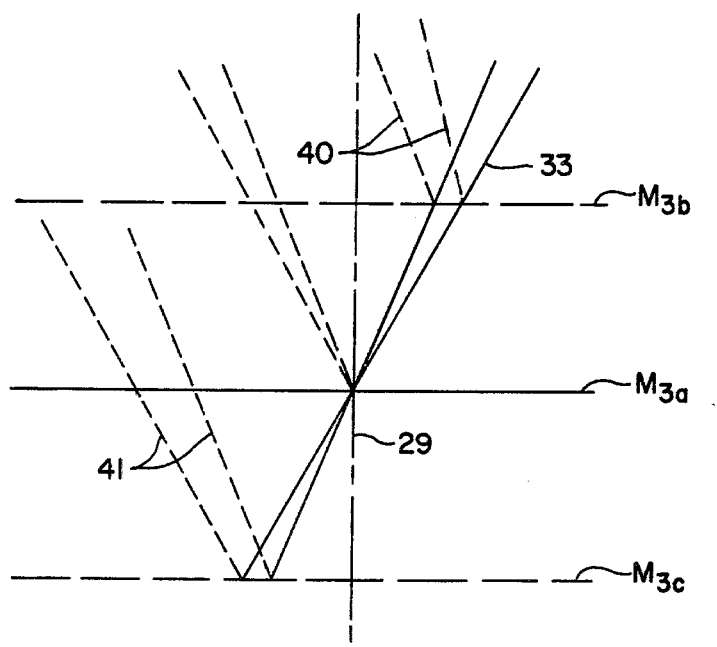
FIG. 4 is an optical diagram illustrating the effect of mirror movement.
Figure 4A:
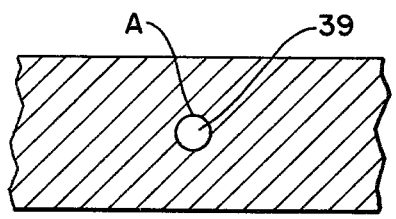
FIGS. 4a, 4b and 4c illustrate three conditions at the aperture plane.
Figure 4B:
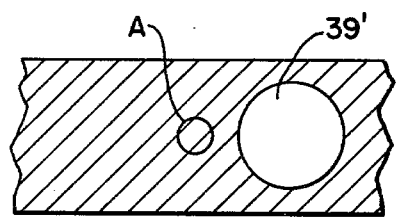
Figure 4C:
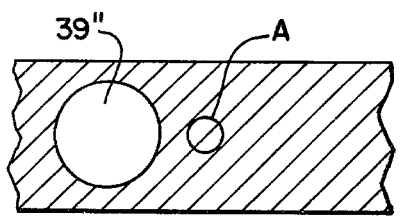

Referring to FIG. 4, the effect of the position of mirror $M_3$ on the beam diameter and location of light reflected toward power objective 19 is illustrated by mirror positions $M_{3a}$, $M_{3b}$ and $M_{3c}$. Mirror position $M_{3a}$ represents the condition where converging light path 33 intersects instrument center line 29 at the plane of reflection by mirror $M_3$. As explained above, this will produce a beam travelling along light path 32 which is spaced the same distance from center line 29 as light path 28. Accordingly, light image 39 is of the same size and in the same location as aperture A as illustrated in FIG. 4a. In mirror position M$_3$b, light travelling along path 33 is reflected before the intersection with center line 29. The reflected beam will have a larger diameter and be displaced toward center line 29 as demonstrated by dotted lines 40. This condition will produce enlarged image 39' which is displaced from aperture A as shown in FIG. 4b. Similarly, when reflection occurs after the intersection with center line 29 in mirror position M$_3$c, the reflected beam will also have a larger diameter but is displaced away from center line 29 as shown by dotted lines 41. This condition will produce enlarged image 39'' which is also displaced from aperture A.

Figure 3:
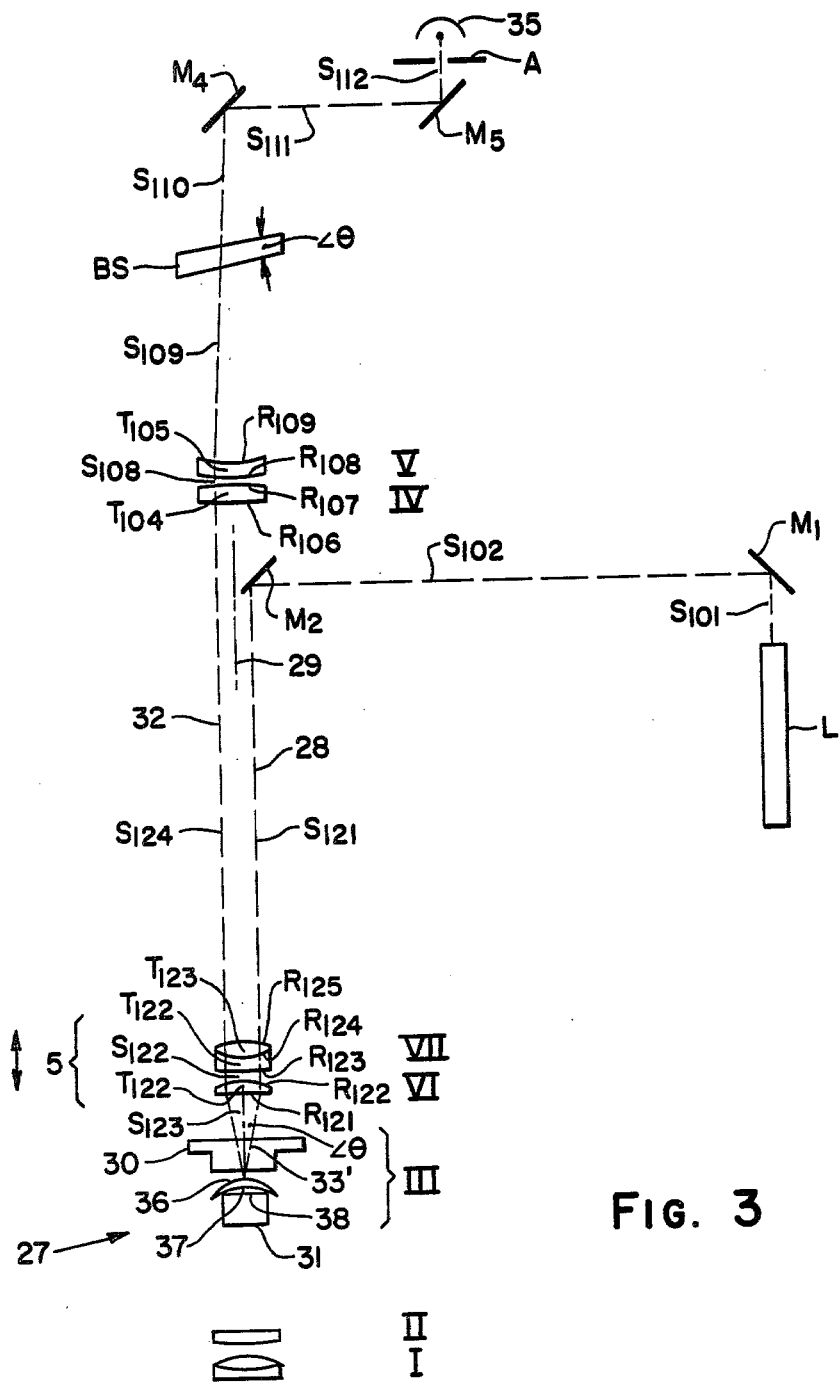
FIG. 3 is an optical diagram of a preferred embodiment of the thickness and saggital height measuring mode of the invention.

Referring to FIG. 3, spacings, radii and thicknesses which correspond to those of FIG. 1 are identified by adding 100 to the identifying number used in FIG. 2. Those spacings, radii and thicknesses that differ are identified with sequential numbers beginning at 121. Instead of mirror M$_3$, the reflective surfaces used in FIG. 3 are anterior surface 36 of contact lens 27, posterior lens surface 37, and top surface 38 of pedestal 31. The preferred embodiment of FIG. 3 has objective 5 with positive meniscus positive lens VI and biconvex positive lens VII. Objective 5 is selectively movable along instrument center line 29 in order that the intersection of converging light path 33 with center line 29 may be selectively located at anterior surface 36, posterior surface 37 and top surface 38. Reflected light from each of these surfaces passes along path 32 to aperture A and detector 35 in the same manner as shown in FIG. 2.

Parameters of one preferred embodiment for determining the thickness and sagittal height of a hydrated contact lens are set forth in Table II.

peak is noted by signal detector A. If mirror M$_3$ is moved manually, stepping motor 25 can be replaced by a displacement indicator, and if electrically driven, the number of steps to the peak can be determined. The instrument is then shifted to the mode of FIG. 3 by rotating turret 4 (FIG. 1) to bring objective 5 onto instrument center line 29. In this mode, three signal peaks will be noted as objective 5 moves toward lens 27. The distance objective 5 moves between the first two peaks is the apparent thickness (T') of the lens and the distance it moves between the second and third peaks is the apparent sagittal height (s'). A first approximation of thickness (t$_1$) is determined by the formula:

$t_1 = At'$, where A is an empirical number. A first approximation of sagittal height (s$_1$) is obtained by the formula:

$$s_1 = s' \sqrt{\frac{n - \sin^2\theta}{1 - \sin^2\theta}}$$

where n is the refractive index of the lens and $\theta$ is the angle of convergence of light path 33'. The first approximation of posterior radius (r$_1$) is obtained by the formula:

$$r_1 = \frac{(\tfrac{1}{2}P)^2}{Bs_1}$$

where P is pedestal diameter and B is an empirical number.

The first approximations of thickness (t$_1$), sagittal height (s$_1$) posterior radius (r$_1$) and back vertex power

TABLE II

| Lens or Mirror | Radius (R) | Thickness (T) | Spacing (S) | Index of Refraction (ND) | Abbe Number ($\nu$) |
|---|---|---|---|---|---|
| M$_1$ | ∞ | | S$_{101}$ = 17.8 | | |
| M$_2$ | ∞ | | S$_{102}$ = 137.4 | | |
| | | | S$_{121}$ = 146.2 − S$_{123}$ | | |
| | R$_{125}$ = −19.800 | | | | |
| | | T$_{123}$ = 3.9 | | ND$_{123}$ = 1.6200 | $\nu_{123}$ = 60.3 |
| VII | R$_{124}$ = 12.840 | | | | |
| | | T$_{122}$ = 3.0 | | ND$_{122}$ = 1.7506 | $\nu_{122}$ = 27.8 |
| | R$_{123}$ = 96.300 | | | | |
| | | | S$_{122}$ = 9.0 | | |
| | R$_{122}$ = −14.370 | | | | |
| VI | | T$_{121}$ = 2.0 | | ND$_{121}$ = 1.6055 | $\nu_{121}$ = 43.9 |
| | R$_{121}$ = −607.600 | | | | |
| | | | S$_{123}$ = 0.5 to 13.2 | | |
| III | Cover Thickness = 6.35 ND = 1.517 | | | | |
| | Distance between cover and pedestal = 4.4 | | | | |
| | Pedestal Thickness = 8.3 ND = 1.517 | | | | |
| | | | S$_{124}$ = 172.6 − S$_{123}$ | | |
| | R$_{106}$ = 112.702 | | | | |
| | | T$_{104}$ = 2.5 | | ND$_{104}$ = 1.573 | $\nu_{104}$ = 57.4 |
| | R$_{107}$ = −72.305 | | | | |
| | | | S$_{108}$ = 0.26 | | |
| | R$_{108}$ = 44.201 | | | | |
| V | | T$_{105}$ = 2.4 | | ND$_{105}$ = 1.580 | $\nu_{105}$ = 41.0 |
| | R$_{109}$ = 27.735 | | | | |
| | | | S$_{109}$ = 56.2 | | |
| BS | | Thickness = 3.2 | | ND−1.517 | < $\theta$ = 0,18' |
| | | | S$_{110}$ = 37.6 | | |
| M$_4$ | ∞ | | | | |
| | | | S$_{111}$ = 55.9 | | |
| M$_5$ | ∞ | | | | |
| | | | S$_{112}$ = 15.7 | | |

In operation, a first approximation of back vertex power (fv$_1$) is obtained by noting the position of mirror M$_3$ in the instrument mode shown in FIG. 2, when a (fv$_1$) are used to obtain more precise values by the following formulae, which are preferably repeated at least once:

$$f_2 = \frac{1-n}{r_1} \quad (f_2 = \text{power of posterior surface})$$

$$f_1 = \frac{f v_1 - f_2}{1 + \frac{(f v_1 - f_2)t_1}{N}} \quad (f_1 = \text{power of anterior surface})$$

$$T = \frac{t_1 n}{1 + t_1 f_1 \left(\frac{n-n_1}{n-1}\right)} \quad \text{THICKNESS}$$

$$Fv = fv + \left[1 - \left(\frac{n-n_1}{n-1}\right)\right] \frac{T(f_1)^2}{n}$$

BACK VERTEX POWER $$S + \frac{s_1 \left[1 - \left(\frac{f_1 T}{n}\right)(n - n_1)\right]}{(Fv - f_2)\left(\frac{T}{n}\right)\left(\frac{n-n_1}{n-1}\right) + 1 + s_1 Fv(n - n_1)}$$

SAGITTAL HEIGHT $$R = \frac{S^2 + (\frac{1}{2}P)^2}{2S} \quad \text{POSTERIOR RADIUS}$$

The new values of thickness, back vertex power, sagittal height, and posterior radius are used instead of the approximation, when each value is recalculated.

When using the embodiments of FIG. 1 and FIG. 2, A preferably has a value of 1.5, B preferably has a value of 1.7 and pedestal diameter P is preferably 10 mm. Calibration curves are plotted from data obtained during the calibration of each instrument. These curves may show a need to correct Fv and/or T for even more precision. The correction necessary is provided by the formulae:

$F = bFv + a$, where b is the slope of the power calibration curve and a is the y intercept (x=0) for adjusted back vertex power, and $T = b'T + a'$, where b' is the slope of the thickness calibration curve and a' is the y intercept.

Figure 5:
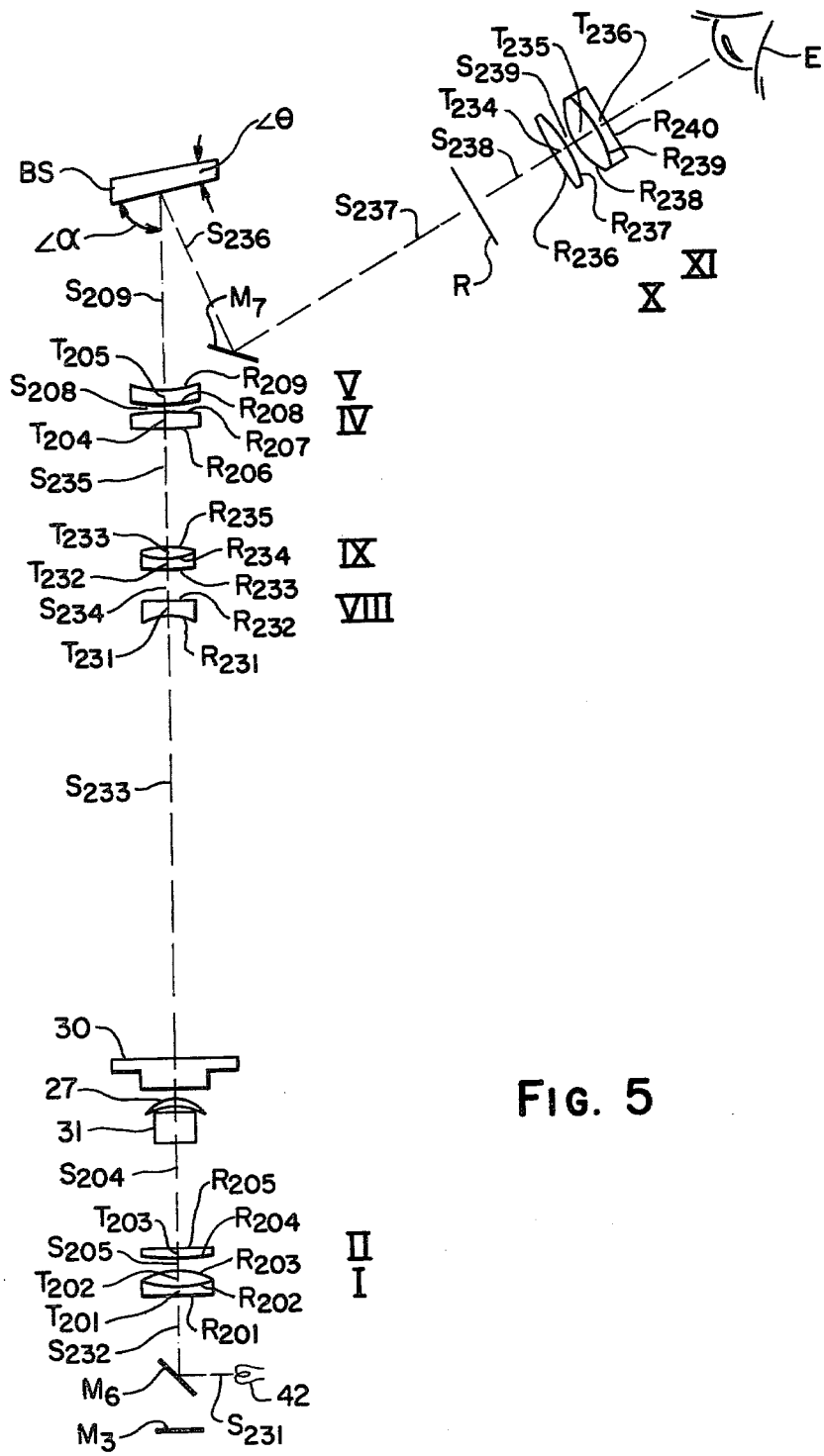
FIG. 5 is an optical diagram of a preferred embodiment for measuring the diameter and centering a lens.

Referring now to FIG. 5, an optional embodiment for measuring the diameter of and/or centering a hydrated contact lens is shown. Light from bulb 42 is deflected by plano mirror $M_6$ along instrument center line 29 toward objective 19 having lenses I and II. Objective 19 directs diverging light toward contact lens 27 to provide a bright ring of light at the edge of lens 27 caused by dispersion. Aperture viewer 7 having lenses VIII and XI is positioned on instrument center line 29 to image illuminated lens 27 in the focal plane of eyepiece 11 in cooperation with telescope unit 34 (lenses IV and V), beam splitter BS and mirror $M_7$. Eyepiece 11 has lenses X and XI with reticle R in its focal plane. Reticle R can have any conventional scale or concentric circles of predetermined spacing for determining lens diameter. Concentric circles are preferred because they conveniently assist in centering contact lens 27 relative to center line 29.

Table III provides the parameters of a preferred embodiment. Spacings and parameters which are identical to those in the embodiment of FIG. 2 have 200 plus the corresponding number in FIG. 2 and the others are numbered sequentially from bulb 42.

TABLE III

| Lens or Mirror | Radius (R) | Thickness (T) | Spacing (S) | Index of Refraction (ND) | Abbe Number (ν) |
|---|---|---|---|---|---|
| $M_6$ | ∞ | | $S_{231} = 9$ | | |
| | | | $S_{232} = 21$ | | |
| I | $R_{201} = \infty$ | $T_{201} = 1.35$ | | $ND_{201} = 1.7506$ | $v_{201} = 27.8$ |
| | $R_{202} = 30.15$ | $T_{202} = 2.6$ | | $ND_{202} = 1.517$ | $v_{202} = 64.5$ |
| | $R_{203} = -18.07$ | | $S_{205} = 3.04$ | | |
| II | $R_{204} = 64.369$ | $T_{203} = 2.4$ | | $ND_{203} = 1.517$ | $v_{203} = 64.5$ |
| | $R_{205} = \infty$ | | $S_{204} = 29.0$ | | |
| Cover Thickness = 6.35 ND = 1.517 | | | | | |
| Distance between Cover and Pedestal = 4.4 | | | | | |
| Pedestal Thickness = 8.3 ND = 1.517 | | | | | |
| | | | $S_{233} = 116.8$ | | |
| VIII | $R_{231} = -14.355$ | $T_{231} = 2.5$ | | $ND_{231} = 1.498$ | $v_{231} = 66.94$ |
| | $R_{232} = \infty$ | | $S_{234} = 10.3$ | | |
| IX | $R_{233} = 67.341$ | $T_{232} = 1.5$ | | $ND_{232} = 1.7506$ | $v_{232} = 27.8$ |
| | $R_{234} = 18.926$ | $T_{233} = 2.5$ | | $ND_{233} = 1.6176$ | $v_{233} = 49.8$ |
| | $R_{235} = -25.792$ | | $S_{235} = 56.9$ | | |
| IV | $R_{206} = 112.702$ | $T_{204} = 2.5$ | | $ND_{204} = 1.573$ | $v_{204} = 57.4$ |
| | $R_{207} = -72.305$ | | $S_{208} = 0.26$ | | |
| V | $R_{208} = 44.201$ | $T_{205} = 2.4$ | | $ND_{205} = 1.580$ | $v_{205} = 41.0$ |
| | $R_{209} = 27.735$ | | $S_{209} = 56.2$ | | |
| BS | ∞ | | $S_{236} = 33.3$ | | |
| $M_7$ | ∞ | | | | |

TABLE III-continued

| Lens or Mirror | Radius (R) | Thickness (T) | Spacing (S) | Index of Refraction (ND) | Abbe Number ($\nu$) |
|---|---|---|---|---|---|
|  |  |  | $S_{237} = 74.1$ |  |  |
|  | Reticle |  |  |  |  |
|  |  |  | $S_{238} = 25.1$ |  |  |
| X | $R_{236} = 80.15$ | $T_{234} = 4.6$ |  | $ND_{234} = 1.517$ | $\nu_{234} = 64.5$ |
|  | $R_{237} = -36.05$ |  |  |  |  |
|  |  |  | $S_{239} = 0.1$ |  |  |
|  | $R_{238} = 19.13$ | $T_{235} = 6.8$ |  | $ND_{235} = 1.517$ | $\nu_{235} = 64.5$ |
| XI | $R_{239} = 29.57$ | $T_{236} = 2.5$ |  | $ND_{236} = 1.786$ | $\nu_{236} = 25.5$ |
|  | $R_{240} = -$ |  |  |  |  |

The embodiments exemplified illustrate moving objective 5 and mirror $M_3$ as a unit relative to contact lens 27 and stationary power objective 19. Since conventional microscopes also provide for focusing by moving the stage, it will be apparent to those skilled in the art that objective 5 and mirror $M_3$ may be stationary and lens 27 and power objective 19 moved as a unit. Also, while not a preferred embodiment, objective 5 and mirror $M_5$ may be operated independently instead of moving as a unit.

I claim:

1. An optical system having a center line for accurately measuring parameters of a soft contact lens supported on a pedestal and submerged in a liquid which comprises,
   a source of collimated light,
   means for directing light from said source toward one side of the lens along a first path parallel to and spaced from the center line,
   first objective means for imaging light on said center line, said first objective means being selectively positionable on the center line between said means and the lens,
   second objective means for imaging light on the center line, said second objective means being located on the other side of said lens,
   reflection means for reflecting light received from said second objective means along a second path, a plane common to said first path, said second path and the center line, and said center line being located between said first and second paths, a portion of said second path being parallel to said center line, and
   detection means for determining when said portion is spaced from said center line the same as said first path.

2. The optical system of claim 1 further including means to provide relative movement between a first unit and a second unit, said first unit including said first objective means and said reflection means and said second unit including the lens and said second objective means.

3. The optical system of claim 2 wherein said first unit moves and said second unit is stationary.

4. The optical system of claim 1 wherein said detection means includes a telescope lens unit, an aperture at the focal plane of said telescope and a light detector means to signal the condition of light imaged in said aperture.

5. The optical system of claim 3 further including means to provide relative movement between a first unit and a second unit, said first unit including said first objective means and said reflection means and said second unit including the lens and said second objective means.

6. The optical system of claim 5 wherein said first objective means is a 10X microscope objective.

7. The optical system of claim 5 further including
   an additional light source,
   means for illuminating the other side of the lens with divergent light from said additional light source,
   imaging means for presenting a periphery image of the illuminated lens to a reticle,
   indicia means on said reticle for measuring lens diameter and
   an eyepiece for viewing the periphery image on said reticle.

8. The optical system of claim 5 further including a lens holder having a cover, a pedestal and a chosen distance between said cover and said pedestal III and wherein said light source is a laser, said means includes mirrors, $M_1$ and $M_2$, said first objective means includes a positive meniscus singlet VI, and a positive biconvex doublet VII, said second objective means includes a plano-convex positive doublet I, and a convex-plano singlet II, said reflection means is a plano mirror $M_3$, said telescope lens unit includes a biconvex positive singlet IV, and a negative meniscus singlet V, and said detection means including a beam splitter BS, mirrors $M_4$ and $M_5$, and aperture A.

9. The optical system of claim 8 having the following parameters:

| Lens or Mirror | Radius (R) | Thickness (T) | Spacing (S) | Index of Refraction (ND) | Abbe Number ($\nu$) |
|---|---|---|---|---|---|
|  |  |  | $S_1 = 17.8$ |  |  |
| $M_1$ | $\infty$ |  |  |  |  |
|  |  |  | $S_2 = 137.4$ |  |  |
| $M_2$ | $\infty$ |  |  |  |  |
|  |  |  | $S_3 = 164.1$ |  |  |
| III | Cover Thickness = 6.35 ND = 1.517 Distance between Cover and Pedestal = 4.4 | | | | |

UNITED STATES PATENT AND TRADEMARK OFFICE
CERTIFICATE OF CORRECTION

PATENT NO. : 4,283,139

DATED : August 11, 1981

INVENTOR(S) : C. Hermas Swope

It is certified that error appears in the above-identified patent and that said Letters Patent are hereby corrected as shown below:

In column 9, line 16, after $R_{240}$ = insert "$\infty$".

In column 11, line 9, after $R_4$ = delete "-".

In column 11, line 11, after $R_3$ = insert "-".

Signed and Sealed this

Thirteenth Day of April 1982

[SEAL]

Attest:

GERALD J. MOSSINGHOFF

*Attesting Officer*      *Commissioner of Patents and Trademarks*